United States Patent [19]

Tibbetts

[11] Patent Number: 4,491,569
[45] Date of Patent: Jan. 1, 1985

[54] FERRIC NITRATE TREATMENT FOR NUCLEATING GRAPHITE FIBER GROWTH BY METHANE PYROLYSIS

[75] Inventor: Gary G. Tibbetts, Birmingham, Mich.

[73] Assignee: General Motors Corporation, Detroit, Mich.

[21] Appl. No.: 496,482

[22] Filed: May 20, 1983

[51] Int. Cl.³ .......................... C01B 31/04; D01F 9/12
[52] U.S. Cl. .................................. 423/447.3; 423/448; 423/458
[58] Field of Search ..................... 423/447.3, 448, 458, 423/632–634; 156/DIG. 68, DIG. 112

[56] References Cited

U.S. PATENT DOCUMENTS 2,796,331  6/1957  Kauffman et al. ................ 423/447.3
4,391,787  7/1983  Tibbetts ........................... 423/447.3

FOREIGN PATENT DOCUMENTS 118913   9/1981  Japan.
1469930  4/1977  United Kingdom ............. 423/447.3

OTHER PUBLICATIONS

Taylor, "J. Iron and Steel Institute", Sept. 1956, pp. 1–6.
Baird et al., "Carbon", 1974, vol. 12, pp. 591–602.

*Primary Examiner*—Edward J. Meros
*Attorney, Agent, or Firm*—Douglas D. Fekete

[57] ABSTRACT

Graphite fibers are preferably grown by natural gas pyrolysis adjacent a stainless steel surface. Prior to said natural gas pyrolysis, the surface is pretreated by evaporating a ferric nitrate solution to increase the yield of product fibers.

3 Claims, 1 Drawing Figure

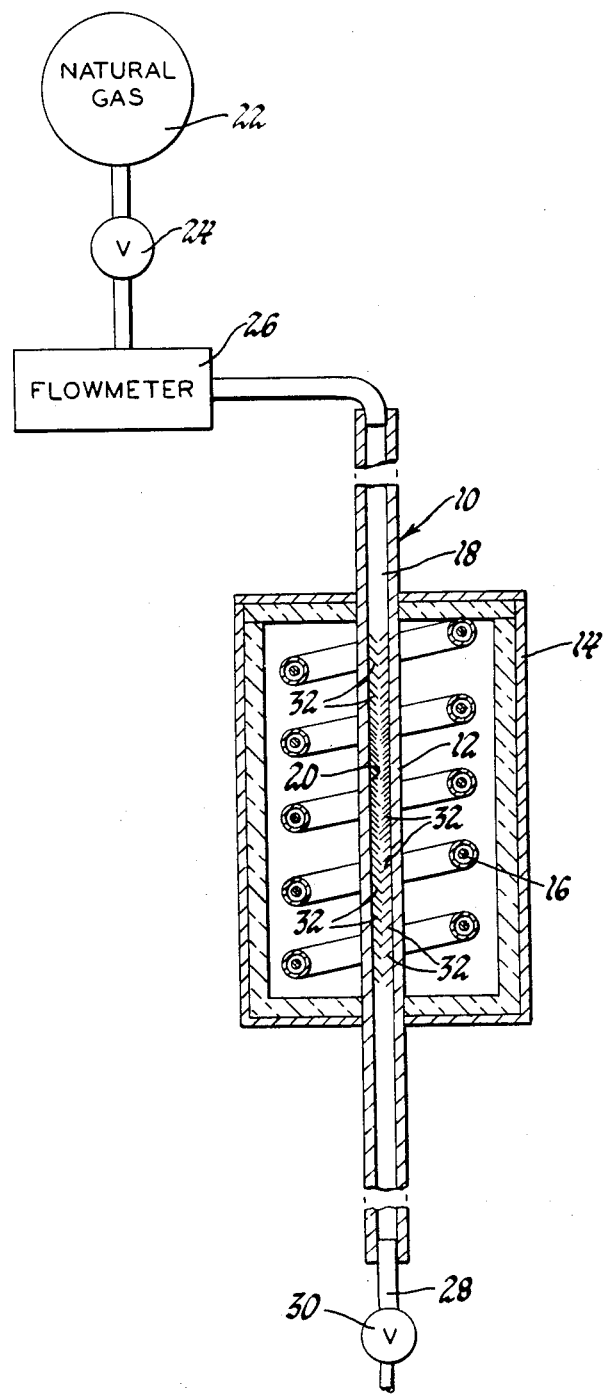

FERRIC NITRATE TREATMENT FOR NUCLEATING GRAPHITE FIBER GROWTH BY METHANE PYROLYSIS

BACKGROUND OF THE INVENTION

This invention relates to manufacturing graphite fibers by a process that comprises thermally decomposing a methane gas adjacent a suitable iron chromium alloy, such as stainless steel. More particularly, this invention relates to growing graphite fibers from the methane decomposition products on a surface that is pretreated to produce a high yield of the fibers.

U.S. Pat. No. 4,391,787 issued July 5, 1983, and assigned to the present assignee, describes a process for manufacturing thin, straight graphite fibers suitable for filler in plastic composites. In a preferred embodiment, a natural gas stream is flowed through a thin-wall stainless steel tube surrounded by wet hydrogen gas and is heated to thermally decompose the methane. Initially, no fiber growth is observed. However, after several hours, graphite fibers sprout from the inner wall. The fibers grow rapidly in length up to several centimeters and thereafter principally grow radially. In this process, it is believed that the presence of the chromium-bearing steel affects the natural gas pyrolysis in such a manner that the products form the desired fibers.

United States patent application Ser. No. 434,734 filed Oct. 18, 1982, describes an improvement in the process wherein a portion of the stainless steel surface is heavily oxidized prior to growing the fibers. The oxidized surface is positioned in the natural gas downstream from natural stainless steel that has not been heavily oxidized. Pyrolysis initially occurs adjacent the natural surface and the product stream flows over the pretreated surface to grow fibers thereon.

Although prior oxidation significantly increases the yield of fibers on a surface, the treatment only applies to iron-base surfaces and has several disadvantages when applied to the preferred stainless steel because of the high temperatures necessary for oxidation, significantly higher than the temperatures required for fiber growth. The high temperatures are achieved, for example, by a welding torch; but the torch only heats a localized region at a time and is inconvenient for treating relatively large surfaces. The intense heating also distorts the shape of the surface and affects other properties of the steel, including those properties that affect methane pyrolysis to grow the fibers. Thus, an untreated upstream surface is necessary for initial pyrolysis, which may form a large portion of the total surface available for growing fibers. Furthermore, the stainless steel becomes carburized during the fiber growing process, which embrittles the steel so that it tends to crack when reheated to oxidation temperatures. Thus, this oxidation pretreatment is not suitable for rejuvenating a surface once used for growing fibers.

Therefore, it is an object of this invention to provide an improved process for manufacturing graphite fibers by methane pyrolysis adjacent stainless steel or other suitable chromium-iron alloy, which process comprises pretreating a fiber-growing surface to deposit an iron oxide thereon to increase the yield of product fibers, but which pretreatment does not affect the substrate. The iron oxide is deposited at temperatures sufficiently low to avoid substrate oxidation by an evaporation technique suitable for quickly and conveniently preparing a relatively large growing surface. The iron oxide deposit increases the number of product fibers per unit area. Thus, this invention increases the density of product fibers grown on a large area to greatly increase the total yield, thereby improving the efficiency of the growing process and reducing the cost of the fibers. The pretreatment is so successful in growing fibers that no special wet hydrogen contact of the type described in the aforementioned patent is required. In addition, the pretreatment is suitable for depositing iron oxide on surfaces other than stainless steel, including nonferrous surfaces, to grow profuse fibers on surfaces that have not heretofore produced fibers in significant numbers.

It is a more particular object of a preferred embodiment of this invention to pretreat a stainless steel surface to enhance graphite fiber growth thereon by methane pyrolysis without altering the character of the stainless steel to interact with methane during pyrolysis in the manner necessary to produce the desired fibers. The pretreatment is not limited to downstream surfaces, but is applicable for any and all fiber-growing surfaces, thereby maximizing the fiber yield. In addition, the pretreatment is suitable not only for enhancing fiber growth on virgin surfaces, but also for rejuvenating surfaces previously employed for fiber growth. Thus, this invention permits a stainless steel surface to be repeatedly and indefinitely employed for growing batches of fibers. It has also been found that the growing time is reduced for rejuvenated surfaces, thereby further reducing the cost of the fibers.

SUMMARY OF THE INVENTION

In a preferred embodiment, these and other objects are accomplished by treating a stainless steel surface with an aqueous ferric nitrate solution prior to growing graphite fibers thereon. The ferric nitrate solution is applied to the surface and evaporated at a temperature near the water boiling point. Evaporation also decomposes the ferric nitrate and deposits on the surface an iron oxide residue. To grow graphite fibers, a natural gas stream is flowed over the treated stainless steel surface while heating to a temperature above 925° C. to decompose methane in the natural gas. It is believed that, under these conditions, the residue forms numerous nuclei on the stainless steel surface and that, once formed, the nuclei react with methane pyrolysis products to grow fibers. In any event, after a time, numerous fibers sprout, grow quickly in length and thereafter grow radially. Pyrolysis is continued until the product fibers reach a desired diameter, preferably 5 to 15 microns.

It is found that a large number of fibers grow on the ferric nitrate pretreated surface. This is attributed to the large number of nuclei derived from the residue. However, except for the residue, the pretreatment has a negligible effect upon the stainless steel. More particularly, it does not interfere with the desired interaction of the natural gas and the stainless steel during pyrolysis that produces carbonaceous precursors suitable for growing fibers. Thus, the entire pyrolysis surface may be treated to enhance fiber growth.

Once the fibers have been harvested from the surface, the pretreatment of this invention may then be performed to redeposit an iron oxide residue. Thereafter, the surface may again be exposed to natural gas pyrolysis to grow fibers. Thus, this invention allows a surface to be repeatedly used for growing fibers. It has been found that a rejuvenated surface sprouts fibers after a shorter time than a similar virgin surface. This is attributed to carburization of the stainless steel during the original pyrolysis that is necessary to condition the steel before fibers may grow. However, once used, the stainless steel is already conditioned and may form the precursors sooner.

DESCRIPTION OF THE DRAWINGS

The only FIGURE is a cross sectional schematic view of a preferred apparatus for growing graphite fibers in accordance with this invention.

DETAILED DESCRIPTION OF THE INVENTION

Referring to the FIGURE, in a preferred embodiment, graphite fibers are grown within a vertical cylindrical stainless steel tube 10. Tube 10 is initially composed of type 304 stainless steel consisting of about 18 to 20 weight percent chromium, 8 to 10 weight percent nickel, about 0.5 to 2.0 weight percent manganese, 0.08 maximum weight percent carbon, about 1.0 weight percent silicon and the balance iron and impurities. The outer diameter is about 1.25 centimeters and the wall thickness is about 0.8 millimeter. A midsection 12 of tube 10 is heated within an insulated furnace 14 by an electrical resistance heating coil 16. Midsection 12 is about 20 centimeters long.

Tube 10 defines a bore 18 that is defined in part by surface 20 of midsection 12, on which surface fibers are grown. In accordance with this invention, surface 20 is treated prior to commencing fiber growth with a 1.5 molar (M) aqueous solution of ferric nitrate, $Fe(NO_3)_3$. Midsection 12 is heated by coil 16 to about 105° C. About 20 milliliters of solution is poured into the tube such that it flows over the inner wall. As the solution flows over the hot surface 20, water is evaporated, as evidenced by steam emanating from the bore. This evaporation deposits a salt residue on surface 20. As seen by a scanning electron microscope, the residue comprises thin flat flakes substantially covering the surface. X-ray defraction analysis indicates a largely amorphous structure comprising predominantly $Fe_3O_4$ and $Fe_2O_3$, with a minor amount of hydroxide. Thus, this moderate heating not only evaporates the water, but thermally decomposes the dissolved nitrate salt. Although the product residue may contain hydroxide and waters of hydration, it is believed to be suitably characterized for the purposes of this invention as a mixture of iron oxides, since subsequent heating that occurs prior to fiber growth is believed to further decompose hydroxide and drive off any water.

After surface 20 is coated with iron oxide, natural gas is flowed through tube 10 to grow fibers. Bore 18 is connected at one end to a natural gas source 22 through a valve 24 and a flow meter 26. A suitable natural gas comprises, by volume, 0.5 maximum percent nitrogen, 0.6 maximum percent carbon oxides, 4.0 maximum percent ethane, 1.1 maximum percent higher hydrocarbons, and the balance methane; and is commercially available from Airco, Inc. under the designation methane grade 1.3. The opposite end of tube 10 is connected to a gas exhaust tube 28 having a valve 30. Valves 24 and 30 are opened to commence the flow of natural gas through tube 10. Valve 24 is adjusted to regulate the flow at about 20 cubic centimeters per minute. This flow corresponds to the residence time within midsection 12 of about 60 seconds.

After the natural gas has flushed air from bore 18, the electrical current through heating coil 16 is increased to heat midsection 12 to about 970° C. At first, no fiber growth is observed. However, after about 6 to 10 hours, numerous fibers 32 are observed growing out from bore surface 20 at an acute angle pointing generally downstream. Very thin fibers rapidly grow to substantially full length and thereafter principally grow in diameter. After about 16 hours, valve 24 is closed to cease the flow of natural gas through tube 10. Tube 10 is cooled and uncoupled from source 22 and exhaust tube 28. Fibers 32 are collected from surface 20, for example, using a bottle brush.

The product graphite surface fibers 32 are generally straight and cylindrical. They vary in length from less than a centimeter up to about 12 centimeters. However, the fibers are remarkably uniform in diameter, ranging, for example, between 10 and 15 microns. Electron microscopic examination reveals a fiber cross section that is characterized by rings or a spiral, that is, the graphite basal planes are annularly or helically oriented. This is referred to as a scroll-like cross section and is in marked contrast to a radial basal plane orientation found in commercially available graphite fibers derived from pitch pyrolysis. The fibers are well suited for use as filler material.

The process, which has been described hereinabove for the first-time growth of fibers on stainless steel, may be repeated to grow additional batches of fibers on tube 10. After the first batch has been collected, tube 10 is retreated with ferric nitrate solution to deposit fresh iron oxide residue on surface 20, whereafter natural gas pyrolysis is resumed to grow fibers. The nature and yield of product fibers are approximately equivalent to the first batch. However, whereas fibers do not appear on the virgin tube until after about 6 to 10 hours, fibers sprout on the previously used tube within about one hour. Once sprouted, the fibers grow in length and diameter at about the same time as before. The shortened initiation time reduces the total time required to grow fibers of a desired size. In the absence of the ferric nitrate pretreatment, no fibers grow on the previously used surface. However, by repeating the pretreatment in accordance with this invention, many batches of fibers may be produced with a single tube 10.

Although the mechanism for fiber growth is not fully understood, it is believed that fiber growth is related to natural gas pyrolysis adjacent a chromium-bearing iron alloy such as stainless steel. Initially during pyrolysis, the steel absorbs nascent carbon, eventually becoming saturated. At about the same time, a carbonaceous layer forms on the surface. This layer contains submicron iron-containing particles suitable for nucleating fibers. Further pyrolysis of the methane gas in the presence of the carburized stainless steel produces heavier carbonaceous species in the gas stream, whose compositions and concentrations are suitable for growing the fibers. These carbonaceous precursors may include aromatic hydrocarbons and also submicron globules that are observable in the gas stream just prior to the commencement of fiber growth. The precursors interact with a nucleus in such a way that a very thin fiber sprouts and grows in length. Thereafter, the fibers grow radially, principally by globule accretion.

The ferric nitrate pretreatment of this invention increases the number of nuclei on the growing surface. Initially during pyrolysis, the iron oxide residue is believed to be reduced or carburized to form numerous iron-containing nuclei. These nuclei are scattered over the stainless steel surface and do not interfere with the interaction of the stainless steel and the gas stream. However, the large nuclei population increases the number of fibers that sprout and grow.

In the described embodiment, fibers are formed within a stainless steel tube that is surrounded by air. The ferric nitrate pretreatment of this invention is also suitable for increasing the yield of fibers grown within a stainless steel tube surrounded by a wet hydrogen jacket such as described in U.S. Pat. No. 4,391,787. It has been found that few, if any, fibers will grow on natural stainless steel, i.e., unpretreated stainless steel, in the absence of a jacket gas such as wet hydrogen. However, the ferric nitrate pretreatment of this invention is so effective for nucleation that no special jacket gas is required.

The ferric nitrate pretreatment is also suitable for growing fibers on surfaces formed of materials other than stainless steel. In an alternate embodiment, the apparatus in the FIGURE is modified to include a thin copper foil overlying a portion of surface 20 in the downsteam half of midsection 12. Prior to placement within tube 10, the foil surface that is to be exposed to the natural gas stream is treated by ferric nitrate evaporation so as to bear an iron oxide residue. Thereafter, natural gas is flowed through the tube and heated for pyrolysis. Pyrolysis is initated adjacent the upstream carburized stainless steel and the resulting precursors migrate downstream to grow fibers on the treated foil surface. It is found that a large number of graphite fibers may be grown on the treated copper surface in this manner. In addition to copper, profuse fibers have been grown on nickel, tantalum and titanium foils using the ferric nitrate pretreatment. Also, fibers have been grown on ceramic surfaces treated with ferric nitrate and positioned within a natural gas stream flowing through a stainless steel tube.

In the described embodiment, the pretreatment was carried out with a 1.5M aqueous ferric nitrate solution. Although a water solution is preferred, other vaporizable solvents may be suitable. The improvement in fiber nucleation is believed to be related to the amount of iron oxide residue on the growing surface, which in turn is related to the volume and concentration of solution employed to treat the surface. A noticeable increase in the yield of product fibers is found for treatments employing as little as one drop of aqueous ferric nitrate solution per square centimeter and concentrations as low as 0.007M. For a 0.02M solution, one drop per square centimeter yields about 6 fibers per square centimeter under process conditions that would not otherwise grow fibers. For the preferred 1.5M solution, similar treatment increases the yield to over 400 fibers per square centimeter. In general, it is found that the logarithm of the number of fibers per square centimeter increases directly with the logarithm of the iron nitrate concentration for a constant volume of treating solution and concentrations up to about 1.5M.

Although in the described embodiments fibers are grown within a tube, the process of this invention is believed suitable for growing fibers within pyrolysis vessels having different shapes. In growing the fibers, natural gas is preferred over higher purity methane, in part because it is believed that the impurities in natural gas may promote fiber growth. Also, although natural gas pyrolysis is preferably carried out between 925° C. and 1075° C., and more preferably between 970° C. and 1000° C., fibers may be suitably grown at temperatures up to 1150° C. or higher.

While this invention has been described in terms of certain embodiments thereof, it is not intended that it be limited to the above description but rather only to the extent set forth in the claims that follow.

The embodiments of the invention in which an exclusive property or privilege is claimed are defined as follows:

1. A process for manufacturing graphite fibers of a type suitable for use as filler in plastic composites, said process comprising
    treating a growing surface by evaporating an aqueous ferric nitrate solution in contact therewith to deposit thereon an iron oxide residue,
    positioning the treated growing surface in a gas flow path such that the treated surface lies downstream from a region of said path wherein gas caused to flow along said path is brought into contact with stainless steel and further such that the treated surface is exposed to gas caused to flow along said path, and
    flowing a natural gas stream along said flow path in contact with said stainless steel and thereafter in contact with said growing surface, while heating the gas, stainless steel and growing surface at a temperature sufficient to produce numerous oxide-derived iron-bearing nuclei on said growing surface, to decompose methane in said natural gas adjacent said stainless steel and to react the methane decomposition product with the nuclei to grow graphite fibers.

2. A process for manufacturing graphite fibers by methane pyrolysis comprising
    evaporating a ferric nitrate solution from a suitable surface to deposit thereon an iron oxide residue,
    pyrolyzing a methane gas in contact with chromium-iron alloy, and
    growing fibers on said residue-bearing surface from the product of said methane gas pyrolysis.

3. A process for manufacturing graphite fibers by methane pyrolysis comprising
    treating a stainless steel surface by contact with aqueous ferric nitrate solution at a temperature sufficient to evaporate water and decompose ferric nitrate to deposit an iron oxide residue, and
    flowing a natural gas stream over the treated surface at a temperature and for a time sufficient to produce numerous oxide-derived, iron-bearing nuclei, to thermally decompose methane in said natural gas stream adjacent the surface and to react the product of said methane decomposition with the nuclei to grow graphite fibers.

* * * * *